United States Patent
Gonzalez Martin et al.

(10) Patent No.: US 11,453,169 B2
(45) Date of Patent: Sep. 27, 2022

(54) GENERATING OUTPUT PRINT DATA

(71) Applicant: HEWLETT-PACKARD DEVELOPMENT COMPANY, L.P., Spring, TX (US)

(72) Inventors: Sergio Gonzalez Martin, Sant Cugat del Valles (ES); Manuel Freire Garcia, Sant Cugat del Valles (ES); Ismael Fernandez Aymerich, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/285,055

(22) PCT Filed: Apr. 26, 2019

(86) PCT No.: PCT/US2019/029325
§ 371 (c)(1),
(2) Date: Apr. 13, 2021

(87) PCT Pub. No.: WO2020/219068
PCT Pub. Date: Oct. 29, 2020

(65) Prior Publication Data
US 2022/0001622 A1    Jan. 6, 2022

(51) Int. Cl.
*B29C 64/386* (2017.01)
*B33Y 50/02* (2015.01)

(52) U.S. Cl.
CPC ............ *B29C 64/386* (2017.08); *B33Y 50/02* (2014.12)

(58) Field of Classification Search
CPC .............................. B29C 64/386; B33Y 50/02
USPC .......................................................... 700/98
See application file for complete search history.

(56) References Cited

U.S. PATENT DOCUMENTS

| | | |
|---|---|---|
| 6,574,523 B1 | 6/2003 | Hanna et al. |
| 6,882,895 B1 | 4/2005 | Knoppers et al. |
| 2013/0077113 A1* | 3/2013 | Rolleston ............. G06F 3/1208 358/1.13 |
| 2014/0277664 A1 | 9/2014 | Stump |
| 2015/0251356 A1 | 9/2015 | Batchelder |

(Continued)

FOREIGN PATENT DOCUMENTS

WO    WO-2013113372 A1    8/2013

OTHER PUBLICATIONS

Chen, Xiang Anthony, et al., Reprise: A Design Tool for Specifying, Generating, and Customizing 3D Printable Adaptations on Everyday Objects, UIST, Oct. 2016, ACM, p. 29-39.

(Continued)

*Primary Examiner* — Gary Collins
(74) *Attorney, Agent, or Firm* — HP Inc. Patent Department (57) ABSTRACT

Certain examples relate to generating output print data representing at least one object. Output print data is generated by performing a geometric transformation on a part of object model data representing the identified region. The object model data represents the at least one object to be printed. The geometric transformation may use a transformation parameter which is determined based at least on the object model data and object property data. The object property data identifies a region of the at least one object and associates it with a selected physical property.

15 Claims, 7 Drawing Sheets

(56) References Cited

U.S. PATENT DOCUMENTS

| | | |
|---|---|---|
| 2016/0096318 A1 | 4/2016 | Bickel et al. |
| 2016/0236416 A1* | 8/2016 | Bheda .................... B33Y 50/02 |
| 2017/0239721 A1* | 8/2017 | Buller .................... B23K 26/04 |
| 2018/0147783 A1* | 5/2018 | Bheda ................... B29C 64/386 |
| 2020/0016883 A1* | 1/2020 | Reese ................ G05B 19/4099 |

OTHER PUBLICATIONS

Simplify3D, Different Settings for Different Regions of a Model, 2019.

Wang, Yufei, et al., Automatic Generation and Fabrication of Designs, Automation in Construction 11, 2002, p. 291-302.

* cited by examiner

GENERATING OUTPUT PRINT DATA

BACKGROUND

Additive manufacturing processes can produce three-dimensional objects by solidifying and unifying successive layers of build material in cross-sectional patterns of the three-dimensional objects according to computer models.

A three-dimensional object to be generated may be represented digitally by a computer model. The digital representation of a three-dimensional object may be processed before being used to generate the object. Structural and decorative properties of three-dimensional objects built in additive manufacturing processes may be controllable and may depend on the process and materials used.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Additive manufacturing systems may generate three-dimensional objects in a multitude of ways. One such way is through the selective solidification of portions of successive layers of build material. Some such systems may solidify these portions of build material by selectively depositing agents to the portions to be solidified. Some systems use liquid energy-absorbing agents, or fusing agents, that cause build material to heat up, melt, and then solidify (upon cooling) when suitable energy, such as infra-red energy, is applied. Other systems may use liquid binder agents to chemically bind the selected portions of build material. By performing these processes on successive layers of build material, three-dimensional objects may be generated layer-by-layer.

Other additive manufacturing systems employ different techniques to generate three-dimensional objects. These include fused deposition model (FDM) systems, selective laser sintering (SLS) systems, and light polymerization systems.

Generally, three-dimensional objects to be printed are represented by object models. Object models may be generated using computer-aided design (CAD) programs. Some CAD programs may also be able to generate other kinds of data to be used when printing a three-dimensional object according to an object model. CAD programs may also be used to generate settings or select desired characteristics of an object to be printed.

Some additive manufacturing systems may generate three-dimensional objects with desired physical properties by using an appropriate print process. As discussed above, some additive manufacturing systems generate three-dimensional objects by depositing and selectively solidifying portions of successive layers of build material. The print process in these additive manufacturing processes may be controlled by applying detailing agents to selected portions of build material to achieve a desired property. For example, coloring agents, detailing agents, or conductive agents may be applied to achieve the desired properties of the selected portions build material when solidified.

The temporary application of energy may cause portions of build material on which a fusing agent has been applied, or to which a fusing agent has penetrated, to heat up above the melting point of the build material and to fuse. Upon cooling, the fused portions solidify and form part of the three-dimensional object. Detailing agents may control the degree to which the selected portions of build material solidify and/or unify. In some cases, a process of applying energy to the build material may be controlled, such as by increasing or decreasing the power of heating elements which are applying energy to the build material. The time for which energy is applied to the build material may be increased or decreased.

Controlling a print process to achieve a selected property in a three-dimensional object may negatively affect the print process. In some additive manufacturing systems, a print process will generate a plurality of objects within a print volume. Controlling the print process to achieve a desired physical property for an object may affect the printing of other objects in the print process. For example, by increasing the time taken for layers to be processed, or by affecting the heating and/or cooling of the other objects in the print process.

Certain examples described herein address a challenge of achieving a desired physical property in at least part of a three-dimensional object without controlling a print process to achieve the desired physical property. The desired physical property may be selected, for example, by a user of an additive manufacturing system. These examples may be used to reduce the effects on other objects in a print process when generating an object with a desired physical property.

Certain examples described herein make use of transforming object model data to achieve a selected physical property in a region of an object to be printed. For example, performing a geometric transformation on the object model data. The geometric transformation may be dependent on a desired physical property which has been identified for a region of an object to be printed.

There may be interdependence between desired physical properties when generating objects in additive manufacturing systems. Certain examples described herein relate to generating output print data which can be used to print an object with a desired physical property in a selected, or identified, region. Therefore, where the desired physical property affects or impairs other physical properties, the parts of the object which are not in a selected, or identified, region will not be affected.

Figure 1:
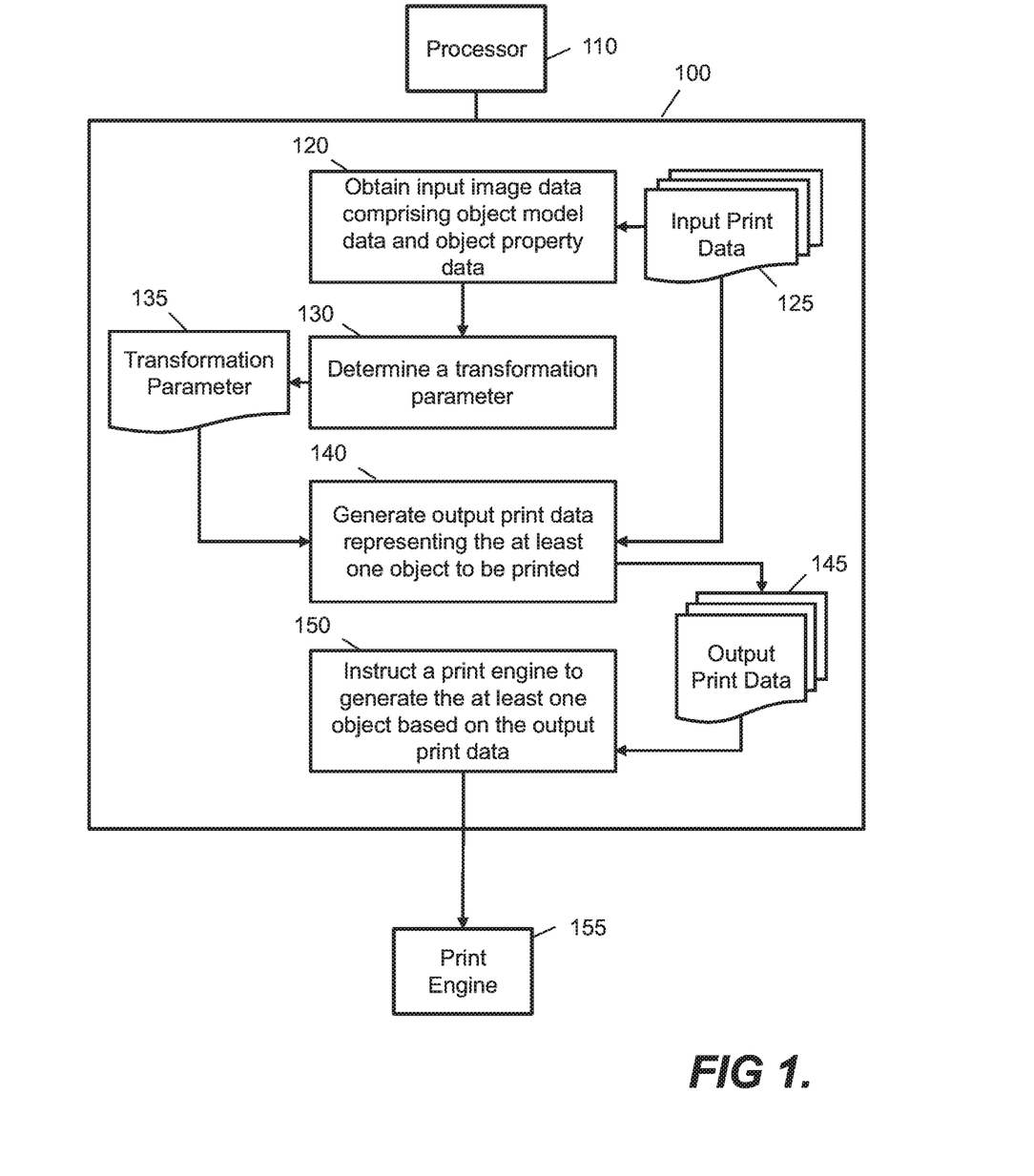
FIG. 1 is a schematic diagram of a non-transitory computer-readable storage medium according to an example.

FIG. 1 shows schematically a non-transitory computer-readable storage medium 100, according to an example. The non-transitory computer-readable storage medium stores instructions that, when executed by a processor 110, cause the processor 110 to perform the following. At block 120, the processor 110 obtains input print data 125 comprising: object model data representing at least one object; and object property data identifying a region of the at least one object and associating the region with a selected physical property.

At block 130, the processor 110 determines a transformation parameter 135 based at least on the object property data and the object model data. The processor 110 then, at block 140, generates output print data 145 representing the at least one object to be printed by performing a geometric transformation on a part of the object model data representing the identified region using the transformation parameter 135. Performing a geometric transformation based on the transformation parameter 135 which is generated using the object property data allows the object model data to be modified to achieve a selected physical property for the identified region. This prevents having to control a print process to achieve a selected physical property.

At block 150, the processor 110 is caused to instruct a print engine 155 to generate the at least one object based on the output print data 145. In this way, the at least one object is printed with the identified region having the selected physical property specified in the object property data.

Returning to block 120, obtaining input print data 125 may comprise receiving input print data 125. For example, the non-transitory computer-readable medium 100 may be part of an additive manufacturing system. Obtaining the input print data 125 may comprise receiving the input print data from a local computer connected to the additive manufacturing system. Alternatively, the input print data 125 may be received over a wide area network from a computer, for example over the internet. A user of an additive manufacturing system may design an object model of and object to be printed in the additive manufacturing process using a program or application. The user may then send input print data to the additive manufacturing system. Input print data 125 may be in 3D Manufacturing Format (3MF), although other formats may also be used. Formats used for input print data 125 may provide more data than just the object model data. For example, input print data may also identify a position and/or an orientation of the at least one object when it is printed within a build volume of an additive manufacturing system.

An object may be represented in object model data as geometric coordinates of vertices and/or edges of surface polygons which define the surface of the object. For example, the object may be represented by a plurality of triangles joined together and formed to approximate a surface of the three-dimensional object. The coordinates may be stored in the object model data. This representation of the object may also be referred to as a mesh.

Object property data may be generated when generating the object model data. For example, a user, or application, which designs and/or generates the object model data may also identify a region of the object which is to be printed. The identified region may be associated with a desired physical property. When generating object model data, a user may operate on a graphical representation of a mesh defining the object. In doing so, the user may select a region of the object which is to be generated with a desired physical property. The user may also at this stage, select a physical property to associate with the selected region. In this case, the object property data identifies one or more surface polygons defining the surface of the object to be printed and may associate the one or more identified surface polygons with a desired physical property.

The object property data may associate the identified region with more than one selected physical property. A user may select a region of the object to be printed and may select more than one physical property for the region. When selecting a physical property, a user may be able to select a degree of that physical property. The user may be able to specify an importance or a desired weighting for the selected physical property such as by selecting a percentage between 0% and 100%, or by operating a slider presented on a graphical user interface. It may be possible to select more than one physical property and to control the degree to which each selected physical property is prioritized in the selected region. In cases where the selected physical properties have an interdependence, it may not be possible to specify certain combinations of selected physical properties for the selected region. In some examples a user may be prevented from selecting certain combinations of physical properties.

Figure 2A:
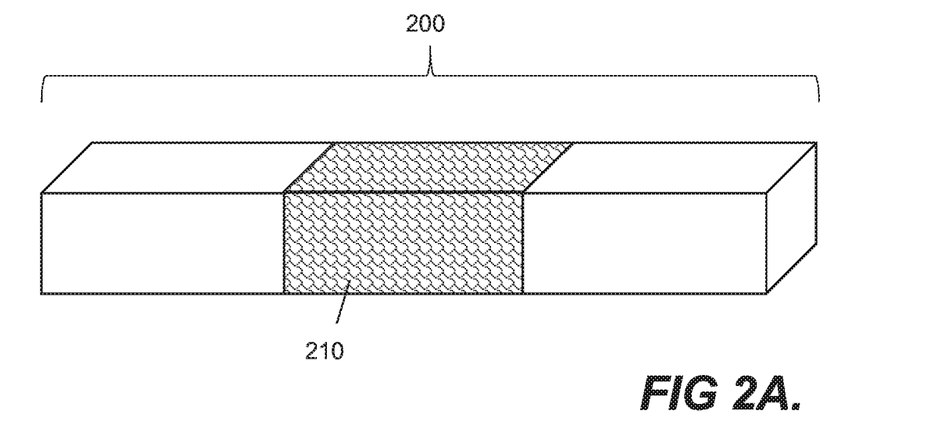
FIG. 2A illustrates a graphical representation of input image data according to an example.

FIG. 2A illustrates a graphical representation of an object 200 defined in input image data. A user may generate the input image data representing the object 200 using the graphical representation. When using the graphical representation to generate the object model data, the user may select a part or region of the surface of the object 200, for example region 210, to associate with a selected physical property. These selected physical properties may include a characteristic of the object and/or the material forming the object. For example, the selected physical properties may be structural or mechanical properties, decorative properties, or a combination of both of these.

Figure 2B:
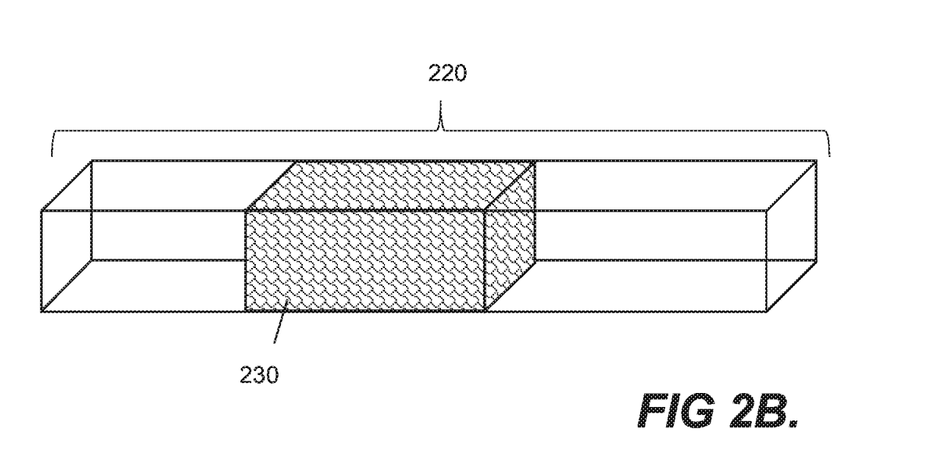
FIG. 2B illustrates schematically a graphical representation of an object define by input image data according to an example.

FIG. 2B illustrates a graphical representation of an object 220 related to object model data. In the example shown in FIG. 2B the object is represented as a wireframe, illustrating the vertices and edges of the object 220. The object 220, when printed, may be a solid three-dimensional object comprising surfaces between the vertices and edges. In the example shown in FIG. 2B, a region 230 to which a selected physical property will be associated, has been selected. In this example, the region 230 which has been selected is a volumetric region comprising at least part of the internal structure of the object 220. The selected physical property of the identified region may be specified as being applicable to the surface or applicable to the internal volume of the object 220.

Returning to block 130 of FIG. 1, the transformation parameter 135 is such that when used to perform a geometric transformation on part of the object model data which represents the identified region of the object, an object model is generated which can be used to generate an object having the desired physical property in the identified region. Examples of selected physical properties and geometric transformations are described further below with reference to FIGS. 5 and 6.

In some examples, geometric transformations may be performed on parts of the object model data not representing the identified regions as well as on parts of the object model data representing the identified regions. Generating output print data representing the at least one object to be printed may comprise performing a further geometric transformation on a further part of object model data not representing the identified region, the further geometric transformation being different to the geometric transformation. For example, the object model data may not be transformed uniformly but may be transformed differently in identified regions than in regions which are not identified. Object model data may be processed, for example, by applying geometric transformations, to correct for dimensional differences between an object represented by the object model data and an object printed using the object model data. In some cases, the processing which is applied to the object model data may be specific to the additive manufacturing system in which the object is to be generated.

Some additive manufacturing systems may introduce systematic errors when generating three-dimensional objects. Differences between an object represented by object model data and an object printed using the object model data may be dependent on the type of additive manufacturing system which is used to generate the object. Specific settings of a print process used to generate the object may also affect the accuracy of the finished object printed based on the object model data. Processing of object model data, such as performing a further geometric transformation on object model data representing regions which are not identified by the object property data may account for the specific settings of a print process.

The object model data may be compensated to ensure the expected dimensional accuracy. This may comprise performing some geometric transformations on the object model data before transforming the object model to achieve a desired physical property. In other cases, transformations performed on the object model data to assure dimensional accuracy may be performed concurrently with transformations to achieve a desired physical property in an identified region.

In some examples, the input image data comprises print job data. The print job data at least identifies a position at which the at least one object is to be generated by the print engine. A print job may be considered a unit of work comprising printing one or more objects based on output print data. For example, in a multiple agent additive manufacturing system a print job may be defined as a print process which fills a build volume of the multiple agent manufacturing system by generating one or more objects. When the build volume is full the print job is ended, and the build volume is emptied, or replaced with an empty build volume, so that another print job can be performed.

Print job data at least defines the position in the build volume at which the at least one object may be generated. The print job data may define the position at which each object to be printed in a corresponding print job will be printed with respect to the build volume. Alternatively, or additionally, the print job data may define the relative positions of multiple objects which are to be printed in the print job.

Print job data may define settings to be used for a corresponding print job. Settings may include any parameters which can affect a print process for generating three-dimensional objects. Some examples of settings include, which agents to apply to selected portions of build material, a specified method of heating build material, an indication of which build materials to use for particular portions of an object to be generated, and any other parameter which may affect the print job. As discussed above 3MF files may be used for input print data, whereby 3MF files may comprise object model data, object property data, and print job data.

The transformation parameter may be determined based at least on the object property data, the object model data, and the print job data. This allows the geometric transformation of the part of the object model data representing the identified region to generate output print data which provides desired physical properties in the identified region as well as compensating based on the settings of the print job.

Generally, physical properties of objects generated in some additive manufacturing systems may be dependent on the respective position of other objects in a print job. For example, in multiple agent additive manufacturing systems, objects in which are generated in close proximity to one another in a print job may act as further heating sources to each other. Consequently, when transforming the object model data, for example, by geometric transformation, accounting for the proximity of the other objects in the print job may provide more accurate generation of objects with selected physical properties in identified regions.

The print job data may identify at least one characteristic of the print engine. This may allow the at least one object to be printed with the selected physical property in the identified region while accounting for a characteristic of the print engine in which the object is printed. The print engine comprises parts of an additive manufacturing system which are responsible for generating the at least one object to be printed using associated output print data. The precise components of the print engine depend on the type of additive manufacturing system in which the examples described herein are implemented.

A print engine will now be described in terms of a multiple agent additive manufacturing system which fuses and unifies selected portions of successive layers of build material by the selective application of agents and application of suitable energy. However, the examples described herein are not limited to such a system. A print engine in a multiple agent additive manufacturing system comprises at least: a build volume in which successive layers of build material are deposited; one or more agent depositors to selectively apply, or deposit, agents on the successive layers of build material; one or more energy sources arranged to apply a suitable amount of energy to the build material to cause the fusing of selected portions of build material, on which suitable agents have been deposited; and a controller for controlling the other components in the print engine to generate three-dimensional objects according to output print data.

The characteristic of the print engine comprises information relating to the print engine with which the objects will be printed based on the output print data. The characteristic of the print engine may be any classifying information which may be used to help determine a transformation parameter. For example, classifying information may include an indicator of a make, model, a particular print engine, or a general type of print engine. Print engine characteristics may provide more specific indications of the way in which object printed using the print engine differ from their associated output print data. In this case, print engine data may be determined by a calibration process. For example, sample objects may be printed according to output print data and the resultant objects may be compared to the respective input print data. Print engine characteristics may be determined based on differences between the resultant objects and the respective output print data.

As discussed above, the non-transitory computer-readable medium may be part of an additive manufacturing system. In such a case, the non-transitory computer-readable medium, or storage attached thereto, may store one or more print engine characteristics. The print engine characteristics may be updated periodically, continuously, or following instruction from a user.

The object property data may identify a plurality of regions of the at least one object and may associate each of the plurality of regions with a selected physical property. The plurality of regions may comprise multiple regions on a single object, multiple regions spread across different objects, or a combination of the two. The plurality of regions may be directly adjacent, opposite, or joining with each other.

Figure 3:
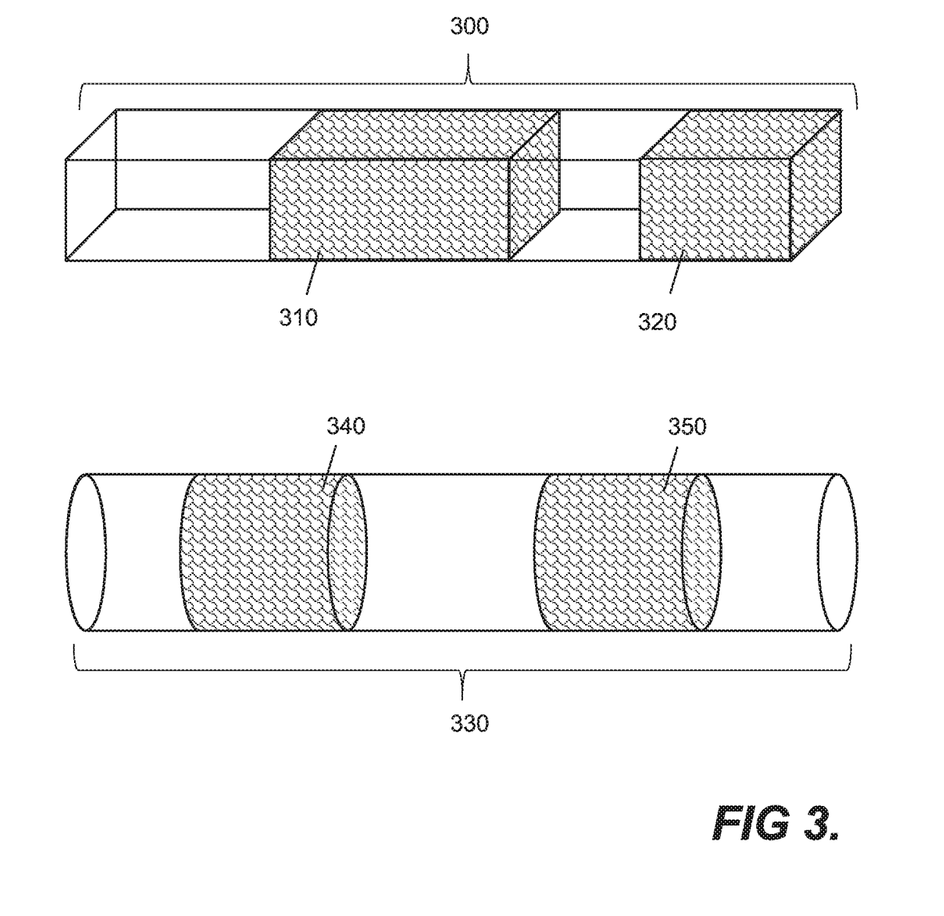
FIG. 3 illustrates a graphical representation of an object defined by input image data according to an example.

FIG. 3 shows schematically a graphical representation of input image data comprising object model data representing two objects to be printed 300, 330, and object property data at least identifying regions of the objects 300, 330. The first object 300 has two identified regions 310 and 320 and the second object 330 has two identified regions 340 and 350. The identified regions 310, 320, 340, and 350 may each be associated with a selected physical property. The identified regions 310, 320, 340, and 350 may all be associated with the same selected physical property or may be associated with different selected physical properties.

In some examples, generating output print data may comprise generating a voxel representation of the at least one object to be printed. The voxel representation of the object to be printed may be generated at a resolution corresponding to a printing resolution at which the print engine is capable of generating objects.

The instructions stored on the non-transitory computer-readable medium, when executed by the processor 110, may cause the processor 110 to determine a plurality of transformation parameters based at least on the object property data and the object model data. In some examples, determining the plurality of transformation parameters is also dependent on the print job data. In an example, where the objects to be printed are represented by meshes of polygons, each identified region may be polygon defining a part of the surface of an object and a transformation parameter may be determined corresponding to each respective identified polygon. In other examples, the identified regions may comprise sets of polygons, and a transformation parameter may be determined for each set of polygons. In some examples a plurality of transformation parameters may be generated for one identified region, such as where multiple parameters are used to define the geometric transformation. The number of transformation parameters which are determined may be dependent on the type of geometric transformation to be performed.

The processor 110 may also be caused to generate output print data representing the at least one object to be printed by performing a plurality of geometric transformations on respective parts of the object model data representing the plurality of identified regions using the plurality of transformation parameters. In this way, output print data may be generated which can be used to generate the at least one object having the selected physical properties in the respective identified regions. Performing these geometric transformations may be computationally expensive and therefore would be impractical if performed for all the object model data. However, by selectively transforming object model data representing the identified regions, a desired physical property may be obtained for identified regions without impairing the efficiency of the processing of print data before generating one or more three-dimensional objects.

Figure 4:
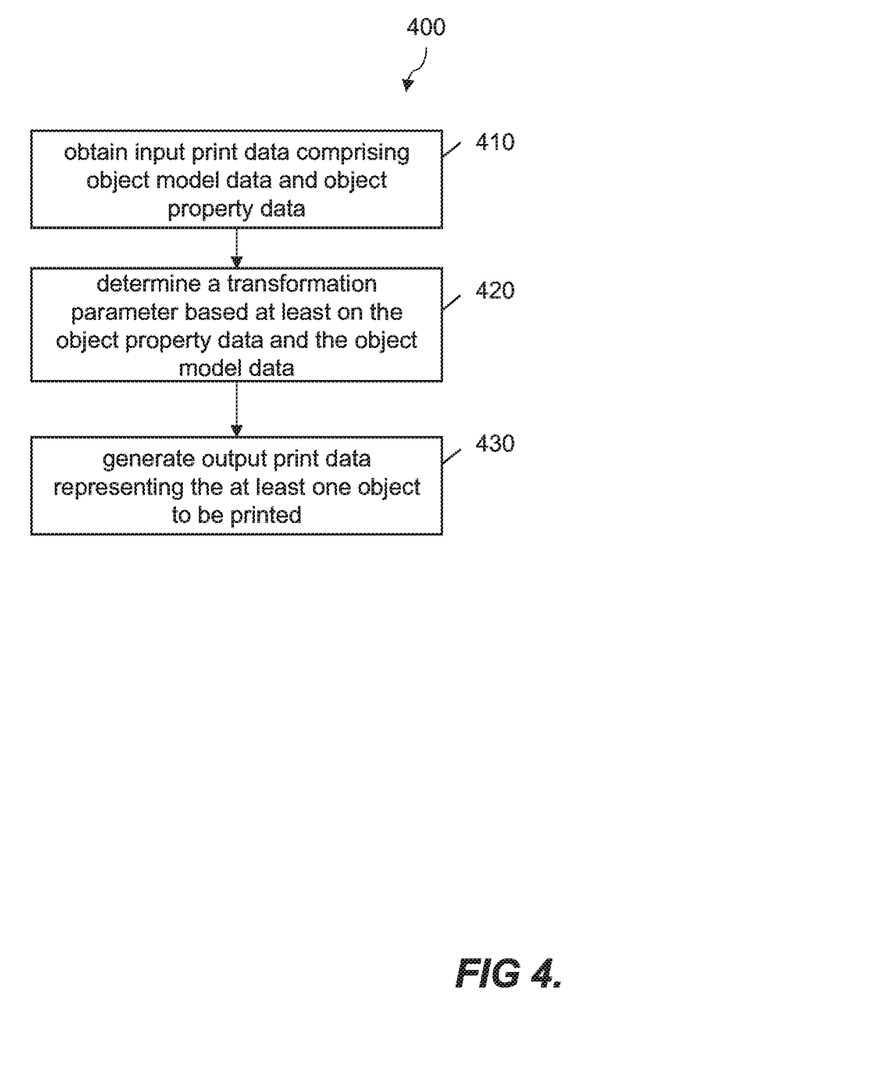
FIG. 4 is a flow chart of a method according to an example.

FIG. 4 shows a flowchart 400 of a method of processing input print data to generate output print data representing at least one object to be printed according to an example. The method comprises, at block 410, obtaining input print data comprising object model data and object property data. The object model data represents at least one object to be printed. The object property data identifies a region of the at least one object and associates the region with a selected physical property. The method comprises, at block 420, determining a transformation parameter based at least on the object property data and the object model data.

At block 430, the method comprises generating output print data representing the at least one object to be printed by performing a geometric transformation on a part of the object model data representing the identified region using the transformation parameter.

As discussed above, this allows the at least one object to be printed with a selected physical property in an identified region without controlling the print process to achieve the selected physical property. Where controlling the print process to achieve the selected physical property may include, applying a specific combination of agents to the build material, or controlling a sequence or method of heating of the build material to achieve the selected physical property. Where a selected physical property is desired in an identified region of an object but not the entire object, having to control a print process to achieve the selected physical property, such as by changing a combination of agents which are applied to the identified region, may impair the efficiency and/or the reliability of the print process.

In some examples, the selected physical property may be a non-geometric physical property. For example, the selected physical property may not relate to the dimensions of the identified region. The selected physical property may relate to a characteristic of the identified region of the object to be printed which is not related to the dimensions of the identified region of the object. That is to say that the method may involve performing a geometric transformation on object model data to achieve a selected non-geometric physical property in an identified region of an object identified in the object model data. In this way, the method may comprise forgoing dimensional accuracy in favor of achieving a selected non-geometric physical property in an identified region of an object.

Selected physical properties may be mechanical properties. For example, mechanical characteristics which define physical aspects of an object generated in an additive manufacturing system. Some non-limiting examples of mechanical properties may include a strength, a rigidity, and a flexibility. Other mechanical properties may also be used without departing from the present disclosure.

The selected physical properties may include decorative characteristics. For example, a selected physical property may be a color of the surface and/or interior of an object in a respective identified region. A selected physical property may include a texture of the surface of the object in the identified region. In some examples, the texture or surface decoration of the identified region may also have a practical application rather than being purely decorative. For example, a selected physical property may be an amount of grip which a surface of an identified region of an object may provide. In this case, the geometric transformation may involve transforming the object model data to provide a ribbed surface to provide an increased amount of grip.

Figure 5:
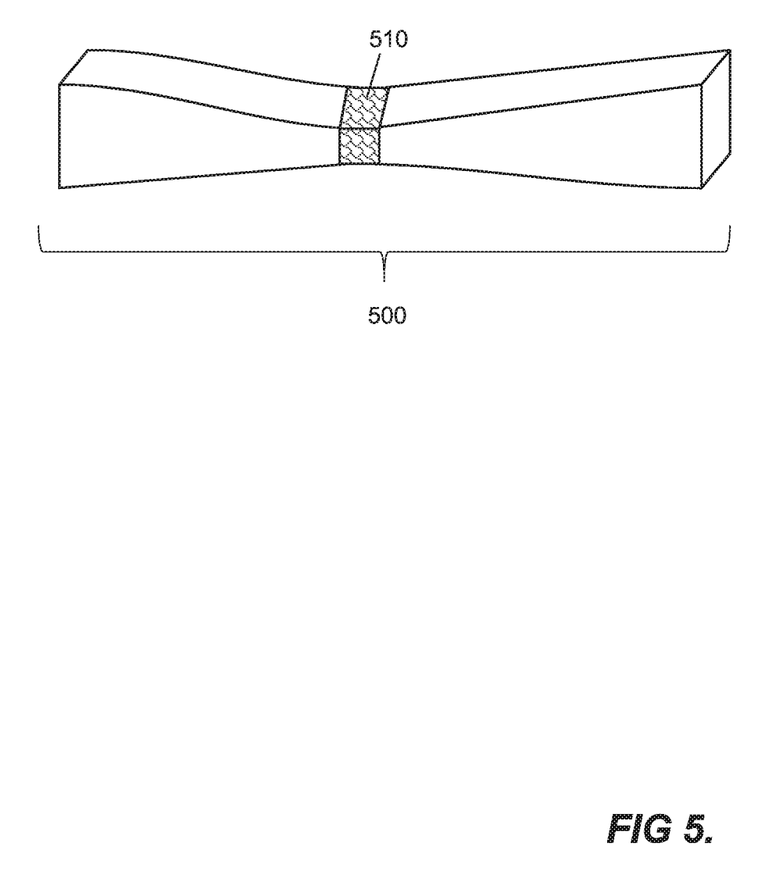
FIG. 5 illustrates a graphical representation of an object defined by input image data according to an example.

FIG. 5 illustrates a graphical representation of an object 500 defined by object model data. The representation of the object 500 shown in FIG. 5 includes an identified region 510 defined by object property data. In the example shown in FIG. 5 the object is thinnest at the identified region 510. In this case a selected physical property associated with the identified region 510 may be a desired amount of strength. For example, the ability to receive a predetermined amount of stress and/or torsion. The geometric transformation performed on the object model data representing the identified region 510 may comprise modifying a thickness of the identified region of the at least one object. Making the identified region 510 thicker by transforming the object model data allows the object, when printed, to have a desired resistance to stress and/or torsion in the identified region 510. In this case, the transformation parameter may specify a radius of a three-dimensional structuring element to be applied to the object model data to perform a dilation or an erosion operation of the object model represented by the object model data. Alternatively, the transformation parameter may specify a radius of one or more two-dimensional structuring elements to be applied to slices of the object model to perform a dilation or erosion operation. The geometric transformation which is performed may involve performing a scaling of the identified region of the at least one object. Accordingly the transformation parameter may be a scaling factor. In some cases, regions of the object around the identified region may be scaled in order to account for dimensional inaccuracies introduced by the one or more geometric transformations performed on the identified region, or regions.

In an example, the geometric transformation comprises modifying an orientation of at least a surface of the identified region of the at least one object. Modifying an orientation of the surface of the identified region, in some manufacturing process, may affect the appearance of the color of the surface of the identified region. In other examples, the appearance of the color of the surface of the identified region of object may be controlled by modifying a thickness of a surface.

The geometric transformation may comprise modifying an internal structure of the identified region of the at least one object. For example, modifying an internal structure may include adding or removing supporting structures within the object in the identified region. Modifying an internal structure may involve reconfiguring the shape or thickness of some structural components of the object to be printed such that the object has a selected physical property in the identified region.

Those features which were described with reference to the non-transitory computer-readable storage medium of FIG. 1 are also applicable to the example method described with reference to FIG. 4. Correspondingly, features which were described with reference to the method shown in FIG. 4 are also applicable to the examples of the computer-readable storage medium described above.

Figure 6:
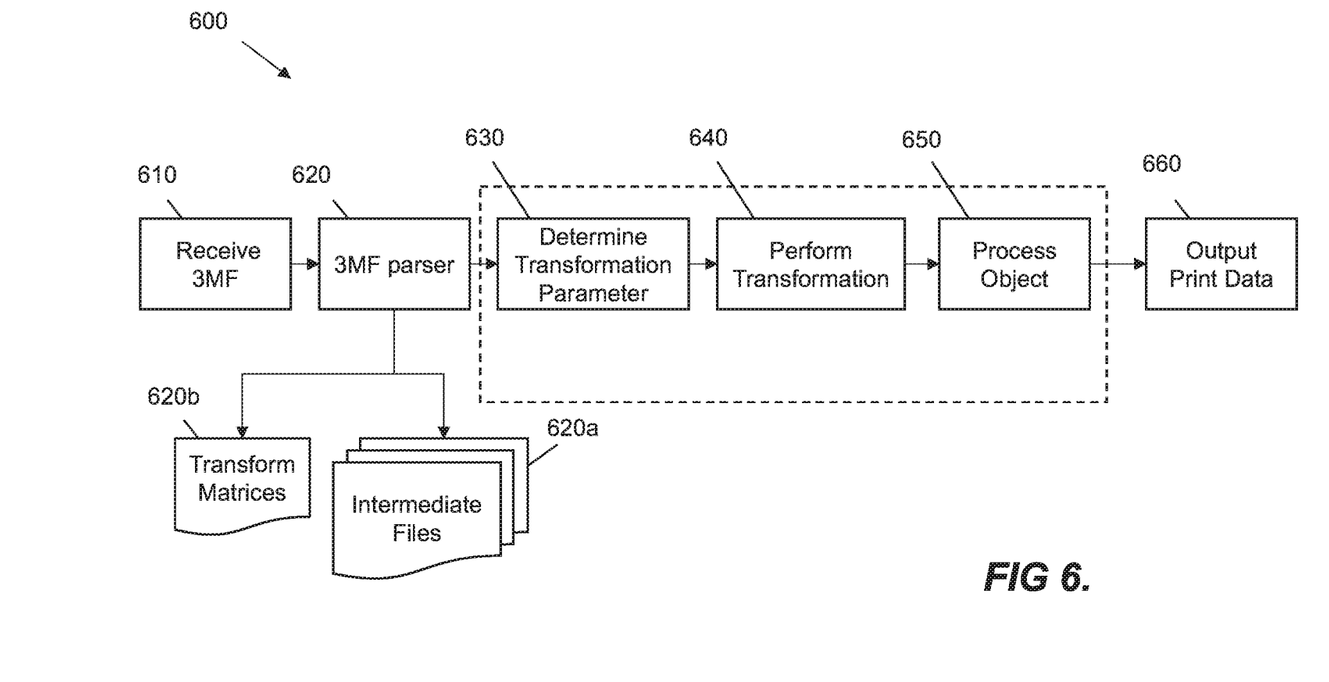
FIG. 6 is a schematic diagram of a work flow according to an example.

FIG. 6 shows a schematic diagram 600 of work flow of a process according to an example. At a first block, 610, the process comprises receiving a 3MF file. As discussed above the 3MF file may comprise input print data including at least object model data and object property data, and in some examples comprising print job data. The 3MF file may be related to a single print job and may specify one object to be printed in the print job or may specify a plurality of objects in the print job and may comprise each object's respective position. The 3MF file 610 may be received at an additive manufacturing system. This may mean receiving the 3MF file at a network device or a controller of the additive manufacturing system.

At block 620 the process includes parsing the 3MF file. Parsing may mean to extract the data within the 3MF file. The data may be parsed into individual intermediate files, shown in block 620a in FIG. 6. Each individual intermediate file corresponding to an object to be printed in the print job. The individual intermediate files comprise object model data and, in some examples, comprise object property data and/or at least part of the print job data. Parsing the 3MF file may also comprise storing or generating one or more transform matrices. The one or more transform matrices when applied to the individual intermediate files may determine the position of the at least one objects when printed by an additive manufacturing system. Each of the individual intermediate files may be associated with a respective transform matrix. In some examples, each individual intermediate file may be used to generate more than one object in a print job. For example, an individual intermediate file may be associated with more than one transform matrix.

The blocks in FIG. 6 which are within the box shown in broken lines represent processes which are repeated for each object to be printed in the print job, i.e. repeated for each of the individual intermediate files shown at block 620a. At block 630, the process comprises determining a transformation parameter. As discussed above, a plurality of transformation parameters may be determined, for example, where the object property data identifies a plurality of regions. The transformation parameter, or parameters, may be determined based on the object property data and, where applicable, print job data. Depending on the type of geometric transformation which is to be performed, a plurality of transformation parameters may be determined even where a single region is identified.

At block 640, the process comprises performing a transformation. The transformation may be a geometric transformation performed on object model data. For example, the object model data representing an object may be transformed according to a transformation factor in an identified region. The transformation performed at block 640 may also comprise a compensation to assure dimensional accuracy in an object generated based on the output print data. At block 650, the process may involve processing the object. As described above, this process is performed for each object in the print job. Processing the object may comprise generating a voxelization of the object to be printed. This may involve generating a voxel representation of the object at a resolution of the print engine which will generate the object.

At block 660, the process comprises outputting the print data. Once each object has undergone the final processing at block 650, the output print data may be sent to a print engine to be printed. The output print data may be in a format which is readable by a controller of a print engine, such that the print engine can generate the at least one object based on the output print data.

Figure 7:
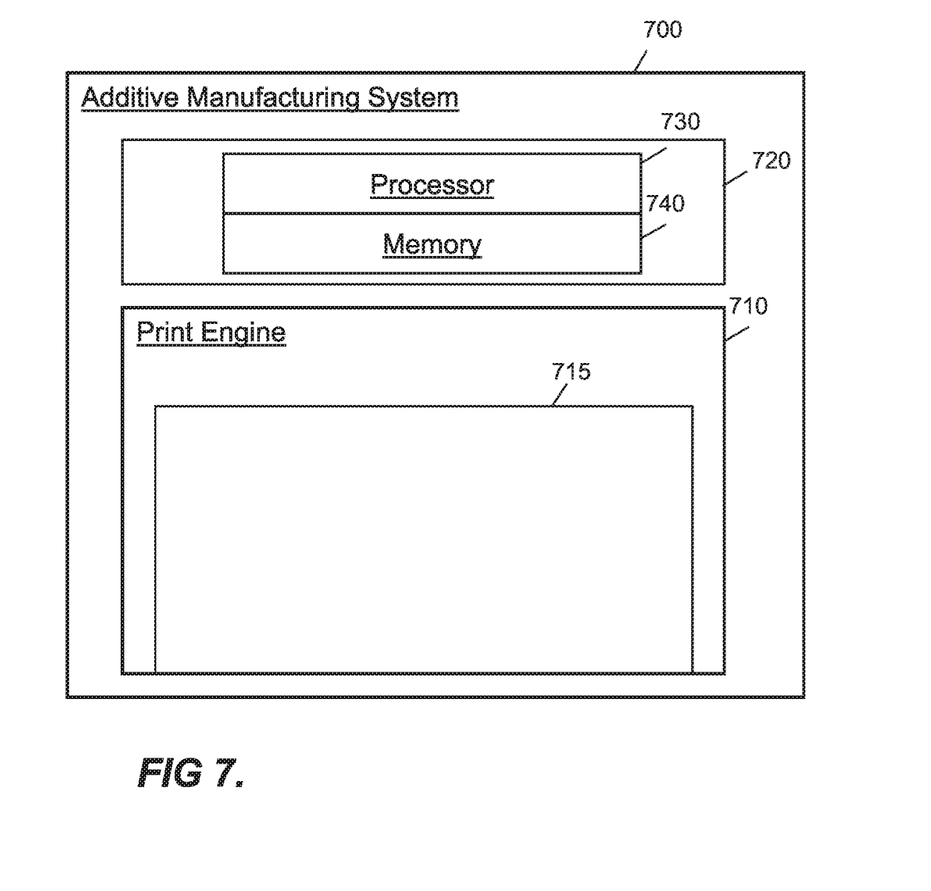
FIG. 7 is a schematic diagram of an additive manufacturing system according to an example.

FIG. 7 shows schematically an additive manufacturing system 700 according to an example. The additive manufacturing system 700 comprises a print engine 710 for printing at least one object based on output print data. The print engine comprises a build volume 715 within which the objects to be printed are printed during a print process. The components of the print engine which are used to generate the objects during a print process are dependent on the type of additive manufacturing which is used. Examples of components in multiple agent additive manufacturing print engine are described above with reference to a multiple agent additive manufacturing system.

The additive manufacturing system 700 comprises a controller 720 to process input print data and to control the print engine to print the at least one object. The controller comprises at least one processor 730 and at least one storage medium 740. The at least one storage medium stores computer program code that, when executed by the processor causes the processor to perform a process as described herein. The process comprises at least obtaining input print data comprising object model data representing at least one object to be printed; and object property data identifying a region of the at least one object to be printed and associating the identified region with a selected physical property. The process comprises determining a transformation factor based at least on the object property data and the object model data. The process comprises generating output print data representing the at least one object to be printed by performing a geometric transformation on a part of the object model data representing the identified region using the transformation factor. In this way, the at least one object may be generated using the output print data and may achieve a desired physical property in the identified region without impairing the print process of other objects within the print job.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A non-transitory computer-readable storage medium storing instructions that, when executed by a processor, cause the processor to:
    obtain input print data comprising:
        object model data representing at least one object to be printed according to a print process specified by print job data; and
        object property data identifying a region of the at least one object and associating the region with a selected physical property;
    determine a transformation parameter based at least on the object property data and the object model data;
    generate output print data representing the at least one object to be printed by the print process without modifying the print job data, by performing a geometric transformation on a part of the object model data representing the identified region using the transformation parameter; and
    instruct a print engine to generate the at least one object based on the output print data.

2. The non-transitory computer-readable storage medium of claim 1, wherein generating output print data representing the at least one object to be printed comprises performing a further geometric transformation on a further part of object model data not representing the identified region, the further geometric transformation being different to the geometric transformation.

3. The non-transitory computer-readable storage medium of claim 1, wherein the object property data associates the identified region with more than one selected physical property.

4. The non-transitory computer-readable storage medium of claim 1, wherein the input image data comprises print job data, the print job data at least identifying a position at which the at least one object is to be generated by the print engine and determining the transformation parameter is based at least on the object property data, the object model data, and the print job data.

5. The non-transitory computer-readable medium of claim 4, wherein the print job data identifies at least one characteristic of the print engine.

6. The non-transitory computer-readable storage medium of claim 1, wherein the object property data identifies a plurality of regions of the at least one object and associates each of the plurality of regions with a selected physical property and the instructions stored on the non-transitory computer readable storage medium, when executed by the processor, cause the processor at least to:
    determine a plurality of transformation parameters based at least on the object property data and the object model data; and
    generate the output print data representing the at least one object to be printed by performing a plurality of geometric transformations on respective parts of the object model data representing the plurality of identified regions using the plurality of transformation parameters.

7. A method of processing input print data to generate output print data representing at least one object to be printed, the method comprising:
    obtaining input print data comprising:
        object model data representing at least one object to be printed according to a print process specified by print job data; and
        object property data identifying a region of the at least one object and associating the region with a selected physical property;
    determining a transformation parameter based at least on the object property data and the object model data; and
    generating output print data representing the at least one object to be printed by the print process without modifying the print job data, by performing a geometric transformation on a part of the object model data representing the identified region using the transformation parameter.

8. The method of claim 7, wherein the transformation parameter is a scaling factor.

9. The method of claim 7, wherein the selected physical property is a non-geometric physical property.

10. The method of claim 7, wherein the selected physical property is a mechanical property.

11. The method of claim 7, wherein the selected physical property is a decorative physical property.

12. The method of claim 7, wherein the geometric transformation comprises modifying a thickness of the identified region of the at least one object.

13. The method of claim 7, wherein the geometric transformation comprises modifying an orientation of at least a surface of the identified region of the at least one object.

14. The method of claim 7, wherein the geometric transformation comprises modifying an internal structure of the identified region of the at least one object.

15. An additive manufacturing system comprising:
    a print engine for printing at least one objects based on output print data;
    a controller to process input print data and to control the print engine to print the at least one objects, the controller comprising:
        at least one processor;
        at least one storage medium storing computer program code that, when executed by the processor causes the processor to:
            obtain input print data comprising:
                object model data representing at least one object to be printed according to a print process specified by print job data; and
                object property data identifying a region of the at least one object and associating the region with a selected physical property;
            determine a transformation parameter based at least on the object property data and the object model data; and
            generate output print data representing the at least one object to be printed by the print process without modifying the print job data, by performing a geometric transformation on a part of the object model data representing the identified region using the transformation parameter.

* * * * *